US011877640B2

(12) United States Patent
Pickett

(10) Patent No.: US 11,877,640 B2
(45) Date of Patent: Jan. 23, 2024

(54) RAZOR DROP

(71) Applicant: Carl Pickett, Columbia, SC (US)

(72) Inventor: Carl Pickett, Columbia, SC (US)

( * ) Notice: Subject to any disclaimer, the term of this patent is extended or adjusted under 35 U.S.C. 154(b) by 896 days.

(21) Appl. No.: 16/898,478

(22) Filed: Jun. 11, 2020

(65) Prior Publication Data

US 2021/0085053 A1 Mar. 25, 2021

Related U.S. Application Data

(60) Provisional application No. 62/973,143, filed on Sep. 19, 2019.

(51) Int. Cl.
*A45D 27/24* (2006.01)
*B26B 21/08* (2006.01)
*B65F 1/16* (2006.01)

(52) U.S. Cl.
CPC .............. *A45D 27/24* (2013.01); *B26B 21/08* (2013.01); *B65F 2001/1692* (2013.01); *B65F 2210/162* (2013.01); *B65F 2240/116* (2013.01)

(58) Field of Classification Search
CPC . A45D 27/24; B26B 21/08; B65F 2001/1692; B65F 2210/162; B65F 2240/116
USPC ........ 206/350, 352–360, 818; 220/230, 483; 221/102, 212; 29/809–810
See application file for complete search history.

(56) References Cited

U.S. PATENT DOCUMENTS

| | | | | | | |
|---|---|---|---|---|---|---|
| 1,646,101 | A | * | 10/1927 | Ordway | A45D 27/24 | 206/39 |
| 2,708,308 | A | * | 5/1955 | Klagges | B26B 21/40 | 221/102 |
| 2,976,986 | A | * | 3/1961 | Linn | B65D 83/10 | 206/356 |
| 3,941,243 | A | * | 3/1976 | Yamada | A45D 27/24 | 206/359 |
| 4,318,473 | A | * | 3/1982 | Sandel | A61B 17/3217 | 206/370 |
| 4,378,624 | A | * | 4/1983 | Klingenberg | A61B 17/3217 | 29/239 |
| 4,395,807 | A | * | 8/1983 | Eldridge, Jr. | A61B 17/3217 | 206/355 |
| 4,453,648 | A | * | 6/1984 | Harris | A61B 50/362 | 206/370 |
| 4,494,652 | A | * | 1/1985 | Nelson | A61B 50/362 | 206/370 |
| 4,730,376 | A | * | 3/1988 | Yamada | A61B 17/3217 | 206/355 |
| 4,746,016 | A | * | 5/1988 | Pollak | A61B 17/3215 | 206/370 |
| 5,145,063 | A | * | 9/1992 | Lee | A61B 50/362 | 206/370 |
| 5,409,113 | A | * | 4/1995 | Richardson | A61M 5/3205 | 206/365 |
| 5,706,942 | A | * | 1/1998 | Vila | A61B 17/3217 | 206/359 |

(Continued)

*Primary Examiner* — Chun Hoi Cheung
*Assistant Examiner* — Brijesh V. Patel
(74) *Attorney, Agent, or Firm* — Melissa B. Neely

(57) ABSTRACT

A device for the removal of used razor blades from the razor handle where the barber does not have to physically touch the used razor blade to remove it from the razor handle. The used razor blades are removed from the razor handle by a magnetic blade removal mechanism and then deposited into a sharps container.

4 Claims, 4 Drawing Sheets

(56) References Cited

U.S. PATENT DOCUMENTS

| | | | | | |
|---|---|---|---|---|---|
| 5,829,588 | A * | 11/1998 | Bloomfield | B65F 1/10 | 206/366 |
| 5,875,533 | A * | 3/1999 | Henry | A61B 17/3217 | 206/355 |
| 5,894,925 | A * | 4/1999 | Sukiennik | A61B 50/362 | 206/359 |
| 6,286,675 | B1 * | 9/2001 | Schmidt | B65F 1/141 | 206/359 |
| 6,792,662 | B2 * | 9/2004 | Samuel | A61M 5/3205 | 29/244 |
| 7,337,903 | B2 * | 3/2008 | Lauri | A45F 5/02 | 206/352 |
| 10,244,842 | B2 * | 4/2019 | Tirado | A45D 27/24 | |
| 2016/0286930 | A1 * | 10/2016 | Wolfe | A45D 27/24 | |

* cited by examiner

RAZOR DROP

CROSS REFERENCE TO RELATED APPLICATIONS

Provisional Patent Application No. 62/973,143

Filing Date: Sep. 19, 2019

Relationship: Provisional application was for same invention.

STATEMENT REGARDING FEDERALLY SPONSORED RESEARCH OR DEVELOPMENT

This invention was not made by an agency of the United States Government nor under a contract with an agency of the United States Government.

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Field of the Invention

Razors have been in use for centuries for the removal of body hair. Excavations of Bronze Age sites uncovered razors made from bronze or obsidian along with other personal hygiene artifacts. Modern times see the utilization of three types of razors: the straight razor, safety razor and electric razor.

Straight razors were the most common form of shaving before the 20th century. Safety razors of various types and electric razors have supplanted the straight razor as the chosen shaving razors. Straight razors, however, are still in use, most commonly in barber shops.

Straight razors, also known as straight edge razors, have an open steel blade sharpened on one edge. Blades are typically constructed of stainless steel or high carbon steel and may be either permanently affixed to the razors handle or disposable.

Disposable blades for straight razors (shavettes) when used in barber shops are replaced between each customer. The used blades are disposed of in a “sharps container”.

A “sharps container” is a hard plastic container used to safety dispose of used hypodermic needles, scalpels, lancets, and other devices used to puncture or lacerate the skin. The containers are used to prevent the transmission of blood-borne diseases, such as hepatitis B, hepatitis C and HIV from contaminated materials. A sharps container is used for the disposal of razor blades in barber shops because of the potential for a blade to be contaminated.

Removal of the ale blade from a disposable straight razor handle presents a risk to the barber removing the blade as the barber could accidently be cut by the blade and if the blade were contamination exposed to a blood-borne disease. The present invention relates to a sharps container for used razor blades and a mechanism for removing the blade from the razor handle without the barber having to touch the used blade.

Description of Related Art

U.S. Pat. No. 10,252,008 (Container for Sharp Medical Waste, issued Apr. 9, 2019 to Erickson, et al.) describes a sharps container for used pen needles, pen needle assemblies, syringe needles and combinations thereof consisting of an outer non-porous housing and an inner storage compartment with an absorbent material.

U.S. Pat. No. 5,145,063 (Sharps Container, issued Sep. 8, 1992 to Lee) discloses a sharps container with a magnet on the bottom of the container. The container is designed for use in a space environment where the absence of gravity makes the use of a standard sharps container problematic. The magnet in the bottom of the Lee patented container attracts the needle or other sharp object and holds it in the bottom of the container.

BRIEF SUMMARY OF THE INVENTION

The present invention is a used razor blades removal and storage device where the used razor blade is removed from the razor handle without the barber touching the used razor blade and the used razor blade is subsequently dropped into the sharps container. The invention includes an outer housing, a sharps container for storing the used blades and a magnetic blade removal mechanism.

DETAILED DESCRIPTION OF THE INVENTION

Figure 1:
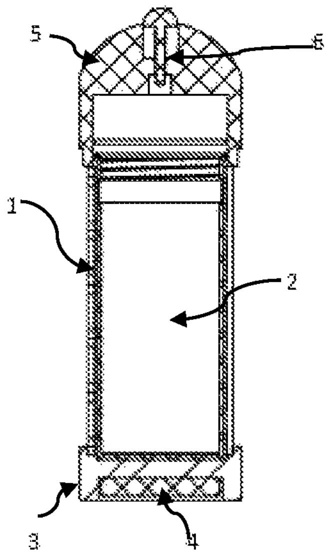
FIG. 1 is an overall view of the invention showing the outer housing (1), the sharps container (2), the base (3) with storage location for the lid (4) for the sharps container (2), a top (5) and the magnetic blade removal mechanism (6).

The present invention is a used razor blade removal and storage device with an integral device for the removal of used razor blades from the razor handle and a sharps container for storage of the used razor blades. The used blades are removed from the razor handle and deposited into the sharps container without the user having to physically touch the blade.

The invention consists of an outer housing (1) inside of which is the sharps container (2). The outer housing (1) and sharps container (2) rest on a base (3). The outer housing (1) and sharps container (2) are covered by a top (5).

The top (5) has razor blade aperture (7) through which the used razor blade is inserted. The blade becomes affixed to the magnetic blade removal mechanism (6) allowing the razor handle to be withdrawn from the invention top (5) detaching from the used blade. Extending vertically downwards from the apex of the top (5) is the magnetic blade removal mechanism (6).

The magnetic blade removal mechanism (6) consists of a plunger (8) with a magnetic (9) at its end and a tube (10) in the top (5) through which the plunger (8) with magnet (9) are inserted. When a used blade is affixed to the magnet (9) and detached from the razor handle, the plunger (8) with the magnet (9) may be pulled upwards through the tube (10). The used blade being too large to fit through the tube (10), detaches from the magnet (9) and falls into the sharps container (2) below.

When desired the sharps container (2) can be removed from the outer housing (1) and the sharps container (2) with the used blades disposed of and a new sharps container (2) inserted into the outer housing (1).

In the preferred embodiment of the invention, the outer housing (1) is constructed of glass and may be covered with a decorative wrap made from high density polyethylene film. Such decorative wrap may be striped like a barber pole, display the brand logo of the razors, or display the name and logo of the barber shop where the invention is being utilized. Although in the preferred embodiment of the invention, the outer housing (1) is constructed of glass, it could be made from other materials such as plastic.

The sharps container (2) inside the outer housing (1) should be a container cleared by the Food and Drug Administration (FDA) or meet the FDA guidelines for such a container which include construction from heavy duty plastic that is leak resistant and has an available tight-fitting and puncture resistant lid. The preferred embodiment of the invention utilizes a sharps container (2) made from acrylonitrile butadiene styrene (ABS) thermoplastic polymer with a lid (4) made from the same material.

The base (3) is constructed of stainless steel but may be constructed of other materials such as plastic, wood, or ceramic. The top (5) is constructed from ABS thermoplastic but may be constructed from other materials.

The plunger (8) and tube (10) of the magnetic blade removal mechanism (6) are preferably constructed from ABS thermoplastic although another plastic material could be utilized.

Figure 2:
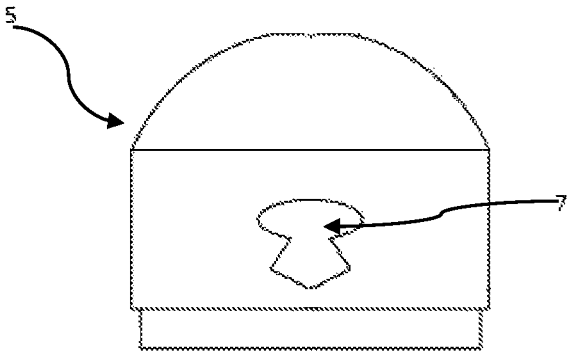
FIG. 2 is a view of the top (5) and the razor blade aperture (7).
Figure 3:
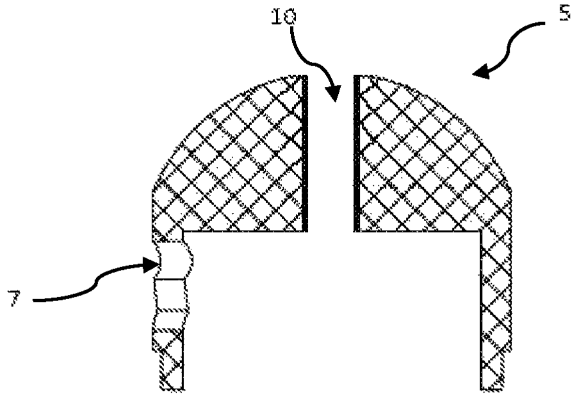
FIG. 3 is a cross section view of the top (5) showing the razor blade aperture (7) and the tube (10) for the magnetic blade removal mechanism (6).
Figure 4:
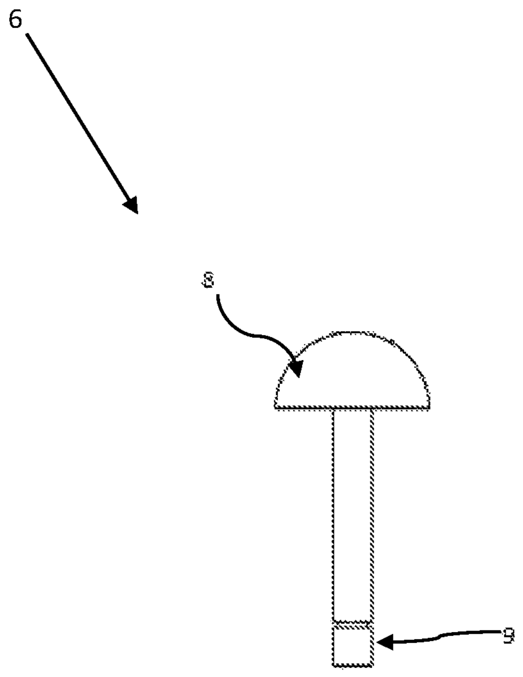
FIG. 4 is a view of the magnetic blade removal mechanism consisting of a plunger (8) with a magnet (9) on the bottom end.

Although FIGS. 1 through 4 and the above description represent the preferred embodiment of the invention, it should be recognized that the invention is not limited to the exact configuration and materials described above.

Potential CPC patent classification for this invention:

A61B 50/3001: Containers specially adapted for packaging, protecting, dispensing, collecting or disposal of . . . sharps.

The present invention described above and illustrated in FIGS. 1 through 4 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention is not limited to the exact forms and details described and illustrated herein but falls within the scope of the appended claims.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A used razor blade removal and storage device, where said used razor blade removable and storage device comprises an outer housing with a base, a sharps container is disposed within the outer housing; the outer housing and the sharps container are covered by a plastic top which has a razor blade insertion aperture, a magnetic blade removal mechanism extends vertically downwards from the apex of said plastic top, and where said magnetic blade removal mechanism comprises a tube, a plunger with a magnet attached to one end is disposed within the tube.

2. The used razor blade removal and storage device of claim 1, where said outer housing is constructed of glass or plastic and where the base of said outer housing is constructed of stainless steel, plastic, wood, or ceramic.

3. The used razor blade removal and storage device of claim 1, where said sharps container is constructed of acrylonitrile butadiene styrene thermoplastic.

4. The used razor blade removal and storage device of claim 1, where said plunger and said tube are constructed of acrylonitrile butadiene styrene thermoplastic.

* * * * *